United States Patent
Roy et al.

(10) Patent No.: US 8,732,468 B2
(45) Date of Patent: May 20, 2014

(54) PROTECTING HARDWARE CIRCUIT DESIGN BY SECRET SHARING

(75) Inventors: Jarrod A. Roy, Austin, TX (US); Farinaz Koushanfar, Houston, TX (US); Igor L. Markov, Ann Arbor, MI (US)

(73) Assignees: The Regents of the University of Michigan, Ann Arbor, MI (US); William Marsh Rice University, Houston, TX (US)

(*) Notice: Subject to any disclaimer, the term of this patent is extended or adjusted under 35 U.S.C. 154(b) by 695 days.

(21) Appl. No.: 12/720,628

(22) Filed: Mar. 9, 2010

(65) Prior Publication Data

US 2010/0287374 A1 Nov. 11, 2010

Related U.S. Application Data

(60) Provisional application No. 61/158,716, filed on Mar. 9, 2009.

(51) Int. Cl.
*G06F 21/00* (2013.01)

(52) U.S. Cl.
USPC .................. 713/171; 726/26; 726/32; 726/34

(58) Field of Classification Search
USPC .................................. 713/171; 726/26, 32, 34
See application file for complete search history.

(56) References Cited

U.S. PATENT DOCUMENTS

| 4,405,829 | A | 9/1983 | Rivest et al. |
|---|---|---|---|
| 5,774,544 | A * | 6/1998 | Lee et al. ..................... 713/189 |
| 6,766,453 | B1 * | 7/2004 | Nessett et al. ................ 713/171 |
| 2005/0171905 | A1 * | 8/2005 | Wankmueller et al. ......... 705/41 |
| 2007/0039046 | A1 * | 2/2007 | Van Dijk et al. ................ 726/22 |
| 2008/0129457 | A1 * | 6/2008 | Ritter et al. .................. 340/10.1 |
| 2008/0138028 | A1 * | 6/2008 | Grady et al. ..................... 386/1 |
| 2010/0287374 | A1 | 11/2010 | Roy et al. |

OTHER PUBLICATIONS

Alkabani et al., "Active hardware metering for intellectual property protection and security," USENIX Security, pp. 291-306 (2007).
Alkabani, et al. "Remote activation of ICs or piracy prevention and digital rights managemen," IEEE/ACM ICCAD, pp. 674-677 (2007).
Benini, et al. "Networks on Chips: A New SoC Paradigm," Computer 35(1):70-78 (2002).

(Continued)

*Primary Examiner* — Kambiz Zand
*Assistant Examiner* — Ali Shayanfar
(74) *Attorney, Agent, or Firm* — Marshall, Gerstein & Borun LLP

(57) ABSTRACT

Techniques are able to lock and unlock and integrated circuit (IC) based device by encrypting/decrypting a bus on the device. The bus may be a system bus for the IC, a bus within the IC, or an external input/output bus. A shared secret protocol is used between an IC designer and a fabrication facility building the IC. The IC at the fabrication facility scrambles the bus on the IC using an encryption key generated from unique identification data received from the IC designer. With the IC bus locked by the encryption key, only the IC designer may be able to determine and communicate the appropriate activation key required to unlock (e.g., unscramble) the bus and thus make the integrated circuit usable.

24 Claims, 5 Drawing Sheets

(56) References Cited

OTHER PUBLICATIONS

Clarke, et al., "Fake NEC company found, says report" EE Times, http://www.eetimes.com/showArticle,jhtml?articleID=187200176 (2006).

Defense Science Board (DSB) study on High Performance Microchip Supply, http://www.acq.osd.mil/dsb/reports/2005-02-HPMS_Report_Final.pdf (2005).

Kahng, et al., "Watermarking Techniques for Intellectual Property Protection," DAC pp. 776-781 (1998).

Keutzer, et al., "System Level Design: Orthogonalization of Concerns and Platform-Based Design," IEEE TCAD 19(12):1523-1543 (2000).

Koushanfar, et al., Interllectual Property metenng.< In Inf. Hiding Workshop, pp. 81-95 (2001).

Lach et al., "Signature hiding techniques for FPGA Intellectual Property Protection," ICCAD, pp. 186-189 (1998).

LaPedus, Qualcomm cracks top-10 in chip rankings. EE Times, Aug. 23, 2007. http://www.eetimes.com/news/semi/showArticle.jhtml?articleID=201801923.

Lee, et al., "Single-Cycle Bit Permutations with MOMR Execution," J. Comp. Sci. Tech. 20(5)577-585 (2005).

Lofstrom, et al., "IC identification circuits using device mismatch," In ISSCC, pp. 372-373 (2000).

Mouli, et al., "Future fab," IEEE Spectrum 44(3):38-43, Mar. 2007, http://www.spectrum.ieee.org/mar07/4941.

Nawathe et al., "An 8-Core 64-thread 64b power-efficient SPARC SoC," In ISSCC, pp. 108-611. 2007. http://www.opensparc.net/opensparc-t2/index.html.

Patel, et al., "Efficient Synthesis of Linear Reversible Circuits", IWLS, pp. 470-477 (2004).

Rabaey, et al., "Addressing the System-on-a-Chip Intercomnect Woes Through Communication-Based Design," DAC'01, pp. 667-672 (2001).

Santo, "Plans for next-gen chips imperiled," IEEE Spectrum 44(8):12-14, Aug. 2007. http://www.spectrum.ieee.org/aug07/5394.

Shende, et al., "Synthesis of Reversible Logic Circuits," IEEE TCAD 22(6):710-722 (2003).

Sgroi, et al., "Formal Models for Embedded System Design," IEEE Design and Test of Computers 17(2):14-27 (2000).

Somenzi, CUDD: CU decision diagram package. Ver. 2.4.1, Univ. of Colorado of Boulder, 2004. http://vlsi.colorado.edu/~fabio/CUDD/.

Su, et al., "A 1.6pJ/bit Stable Chip ID Generating Circuit Using Process Variations," IEEE ISSCC, pp. 406-411 (2007).

Suh, et al., "Physical unclonable functions for device authentication and secret key generation," In DAC, pp. 9-14 (2007).

Tokunaga, et al., "True random number generator with a metastability-based quality control," In IEEE ISSCC, pp. 404-405 (2007).

Trimberger, "Trusted Design in FPGAs," DAC, pp. 5-8 (2007).

\* cited by examiner

PROTECTING HARDWARE CIRCUIT DESIGN BY SECRET SHARING

CROSS REFERENCE TO RELATED APPLICATIONS

The present application claims the benefit of U.S. Provisional Application No. 61/158,716, entitled "Protecting Bus-Based Hardware IP by Secret Sharing", filed on Mar. 9, 2009, which is hereby incorporated by reference herein in its entirety.

BACKGROUND OF THE DISCLOSURE

1. Field of the Disclosure

The disclosure relates generally to integrated circuit design and, more particularly, to protecting integrated circuit designs from unauthorized copying 2. Brief Description of Related Technology As designs become more complex and on-chip transistor counts reach into the billions, a semiconductor designer's skills, methodologies, and tools are increasingly more valuable assets. This is particularly true for the small- and medium-sized fabless design companies. The soaring costs of building and maintaining state-of-the-art semiconductor manufacturing facilities and nano-scale masks is driving even the large design houses to abandon their home manufacturing and become fabless. For example, Texas Instruments (TI)—the then third largest semiconductor company in the world—announced in May 2007 a new foundry strategy by which third party foundry vendors would split the company's 45-nm fabrication.

A designer's use of a separate fabrication facility can leave the designer at substantial risk for theft of their intellectual property (IP) designs. The current trust models and royalty agreements do not fully protect the rights of the designers. The hardware IP providers pay the expenses of masks for their designs, trusting that the foundry would not make additional copies outside the contract. The ready availability of masks, low cost of silicon, and lack of IP owner's control over the manufacturing flow can facilitate illegal copying of integrated circuits (ICs). Furthermore, IC packaging obscures the chip's internals and makes it difficult to trace the owner of IP rights.

Large-scale integration of millions of nano-scale devices is used in many ICs today, including microprocessors, digital signal processing (DSP) chips, field programmable gate arrays (FPGAs), and dedicated graphic chips. A major research challenge is to develop IP protection techniques that are powerful and general enough to protect against theft of these types of devices. At a base level, protecting against theft of these devices is daunting because these devices have fundamentally different structures. For example, memory-based products, such as flash memories and FPGAs, are so regular and so flexible that locking only a small part of a chip will not prevent one from using the rest of the chip, while locking the entire chip would lead to an unacceptably high overhead.

Until recently, only passive IC protection was available, based on unique chip IDs or programmable parts. Alkabani and Koushanfar [Y. Alkabani and F. Koushanfar, "Active hardware metering for intellectual property protection and security," USENIX Security, pp. 291-306, 2007] proposed the first active scheme to fight hardware piracy by locking the chips at fabrication such that the designer is the only entity who can send the unlocking key. The method exploits the inherent unique manufacturing variability of the ICs to generate random chip identification data (IDs). The IDs are integrated within the finite state machine (FSM) which is a modified version of the original FSM in a way that every chip starts in a unique state (locked). The designer, knowing the modified FSM structure, would be the only entity who can send the key to activate (unlock) the IC. Another remote activation scheme was proposed in Y. Alkabani, F. Koushanfar, and M. Potkonjak, "Remote activation of ICs for piracy prevention and digital rights management," IEEE/ACM ICCAD, pp. 674-677, 2007. This method relies on a set of unique chip IDs to lock the sequential and combinational structure of the circuit by locking the transitions on the FSM of the design, for pairs of consecutive transitions of a few replicated states.

SUMMARY OF THE DISCLOSURE

The present application may take advantage of the fact that many of the modern IC designs communicate through busses and/or rely on an internal bus to support their primary functions. For example, FPGAs are programmed through an input bus; CPUs rely on several internal busses; GPUs stream pixels and texels through a graphics bus; network processors communicate through an Ethernet bus or antennae; and an entire class of bus-based devices depend entirely on industry-standard busses, such as universal serial bus (USB), Peripheral Component Interconnect (PCI) bus, PCI-Express, Advanced Microcontroller Bus Architecture (AMBA), etc. While the specific uses of busses and applications may have nothing in common, the functionality of all devices critically depends on a small number of busses.

The present application describes techniques for locking and unlocking ICs by manipulating their busses. In some examples, a bus-based IC protection method authorizes activation of each individual IC and hence can control the number of working chips that contain a particular semiconductor design. As such, activation (i.e., unlocking) of an IC can be achieved after fabrication, using a bus-based IC protection approach.

In some examples, the present application includes techniques that involve scrambling an IC bus using a key generated by scrambling bit permutations and substitutions. That key may be unique to each IC; and the scrambling may render the IC unusable for anyone who does not have the specific key for the IC. In some examples, only the semiconductor designer or specific owner of the rights in the IC design, with access to design details, may be able to compute the shared key required to unlock (e.g., unscramble) the bus and make the IC usable.

The present application covers various techniques to determine the key. In some examples, the key may be calculated simultaneously by an external source (e.g., the designer) and the IC. For example, an asymmetric Diffie-Hellman (D-H) secret sharing protocol or other key sharing protocol may be used that that relies upon communication of data between the external source and the IC, but that does not reveal the key in the communications to and from the IC. Using a cryptographic protocol that always joint establishment of a shared key without communication of that the key can prevent eavesdroppers (or eavesdropping technology) from recording communications between the IC and external source and unlocking the IC. The eavesdropper would not be able to compute or determine the shared key required for activation.

These techniques are able to protect the hardware design (i.e., often the most valuable IP) at the mask level to prevent unauthorized manufacturing of the IC by making all chips initially inoperable and thus require activation, which will fail for unauthorized chips.

The techniques of IC locking and activation as provided in the present application are applicable to a broad category of electronic systems that rely upon a primary bus for operation. Example systems include (1) numerous IC devices compatible with USB, PCI, PCI-E, and AMBA bus architectures and other bus standards typically used in System-on-a-Chip designs and computer peripherals, (2) SRAM-based FPGAs that are programmed through an input bus, (3) general-purpose and embedded microprocessors, including soft cores or multiple hardware cores, (4) DSPs, (5) network processors, and (6) game consoles. Generally speaking these are digital devices having a bus-based architecture, and implemented using semiconductor technology. The present application discusses IC examples of such digital devices with bus-based architecture. It will be appreciated by persons of ordinary skill in the art that any reference herein to an IC, IC chip, or chip is more broadly a reference to any suitable digital bus-based device. In any of these and other devices, particular IC designs can be locked and protected from theft and unwanted activation by scrambling the central bus, e.g., by controlled reversible bit-permutations and substitutions, and establishing a unique code per IC, where that unique code may be derived using a true random number generator and Diffie-Hellman cryptography shared code development, performed during IC activation.

In accordance with one aspect of the disclosure, a method for locking a bus in a digital bus-based device, the method comprising: the digital bus-based device randomly generating a first unique ID for the device such that the first unique ID is different than IDs for a plurality of other digital bus-based devices fabricated along with the digital bus-based device; an authenticator external to the digital bus-based device generating a second unique ID for the digital bus-based device, where both the authenticator and the digital bus-based device apply a modulo function on their respective first and second unique IDs; communicating the first unique ID, applied to the modulo function, from the digital bus-based device to the authenticator and in response the authenticator determining a first secret authentication key derived from the received first unique ID applied to the modulo function; communicating the second unique ID, applied to the modulo function, from the authenticator to the digital bus-based device and in response encrypting the digital bus-based device with a second secret authentication key derived from the received second unique ID applied to the modulo function; and communicating the first secret authentication key to the digital bus-based device, wherein the digital bus-based device determines if the first secret authentication key is the same as the second secret authentication key in which case the bus in the digital bus-based device is activated, wherein if the first secret authentication key is not the same as the second secret authentication key, the bus in the digital bus-based device is not activated.

In accordance with another example, a method for controlling activation of an integrated circuit (IC) having a unique IC identification data, comprises: an authenticator external to the integrated circuit generating a unique authenticator identification data corresponding to the IC, the authenticator being coupled to the IC through a bus; applying a transformation rule to the unique IC identification data and to the unique authenticator identification data to form a transformed IC identification data and a transformed authenticator identification data, respectively; sharing the transformed IC identification data and the transformed authenticator identification data; deriving a first secret authentication key from the transformed IC identification data and deriving a second secret authentication key from the authenticator identification data; and encrypting the IC using the second secret authentication key, wherein the IC is deactivated unless the IC receives the first secret authentication key and determines that a comparison of the received first secret authentication key and the second secret authentication key is valid.

BRIEF DESCRIPTION OF THE DRAWING FIGURES

For a more complete understanding of the disclosure, reference should be made to the following detailed description and accompanying drawing figures, in which like reference numerals identify like elements in the figures, and in which.

Figure 4:
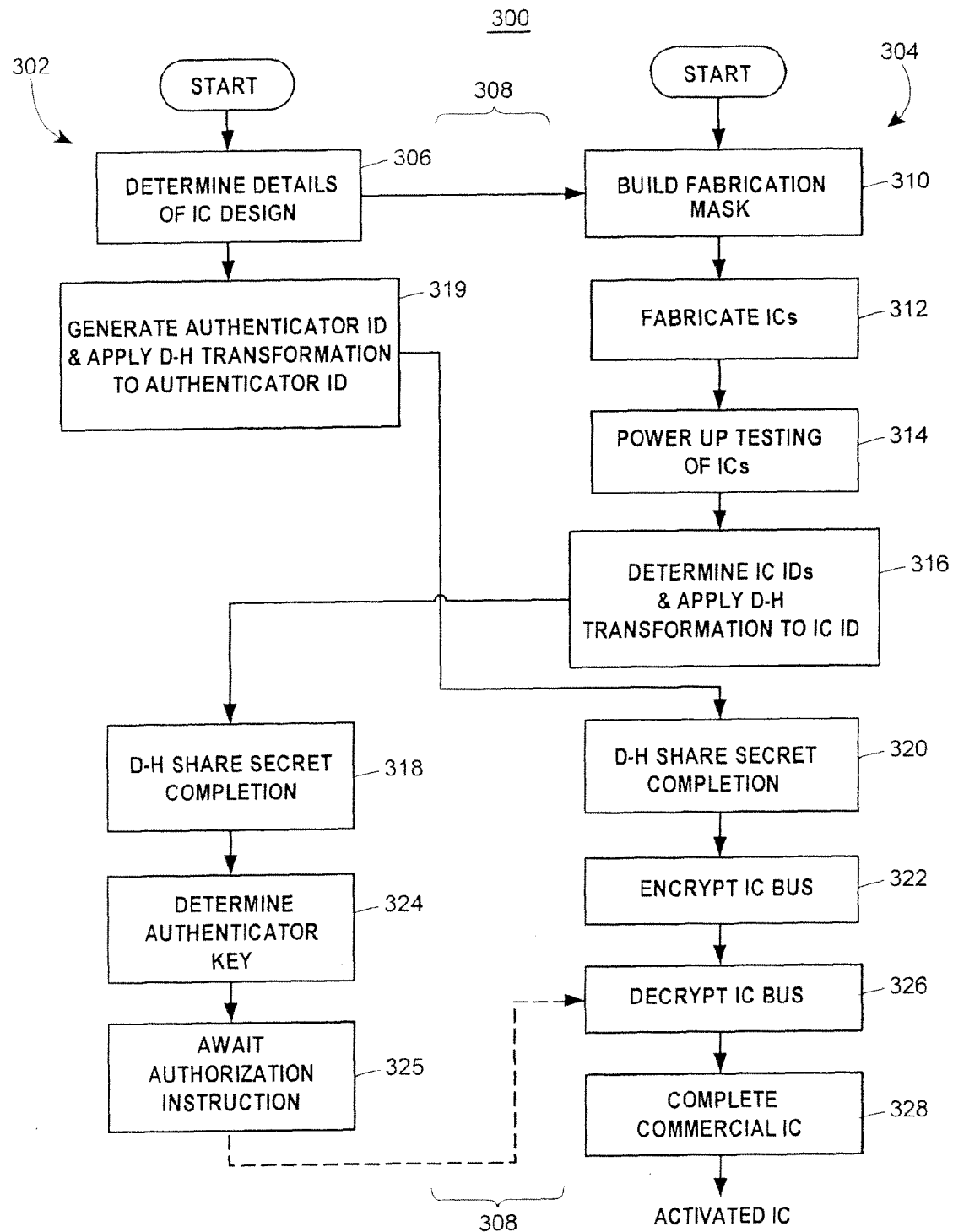
Figure 5:
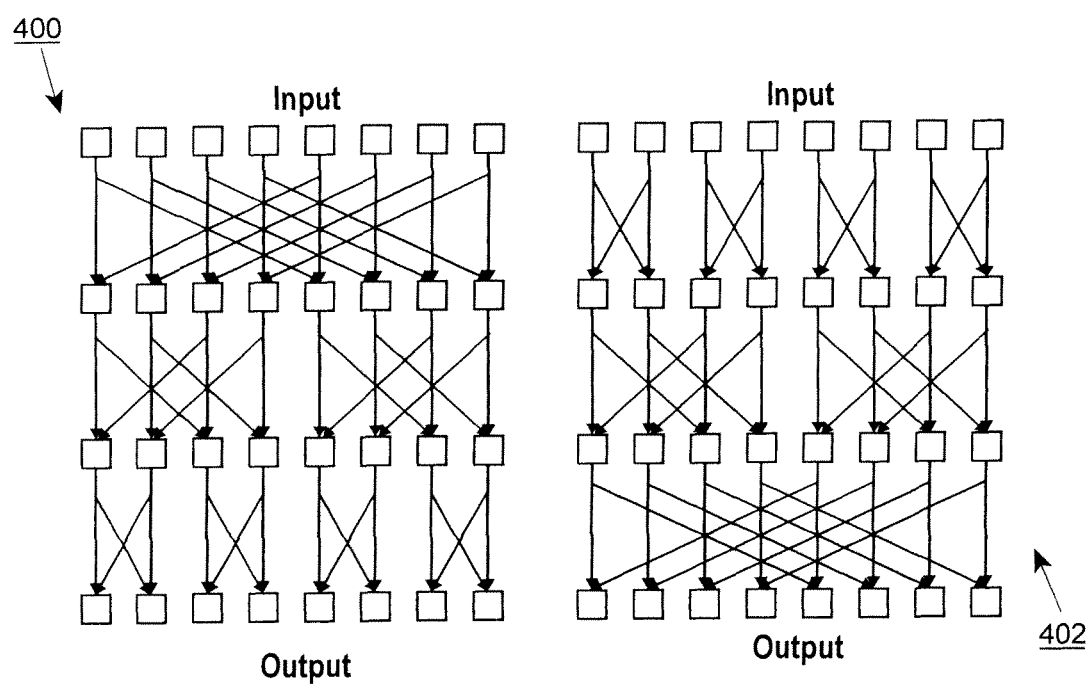

FIG. 4 is a block diagram showing the a process of locking and activating a bus architecture using cryptographic communications between two users, a design house (a first user) and a foundry or fabrication house (a second user); and FIG. 5 is a block illustration of an 8-bit Benes network made of two components: (a) on the left-hand side a butterfly network and (b) and on the right-hand side an inverse butterfly network. In this network, bus wires are the labeled inputs and outputs and four different bus-key inputs per level (not shown) control the 2-to-1 MUX gates, for a total of 24 bits per key. To pipeline the computation so that one permutation completes per cycle, the butterfly network is applied on the first cycle and the inverse butterfly network on the second cycle.

DETAILED DESCRIPTION

Figure 1:
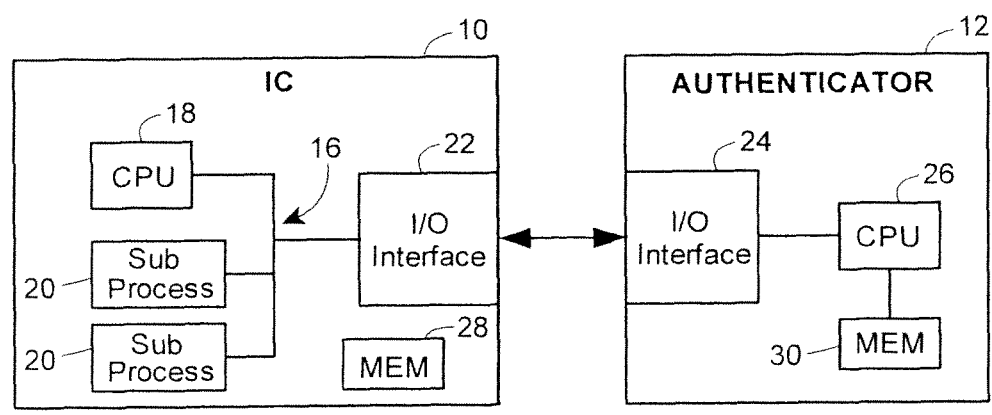
FIG. 1 is a block diagram an integrated circuit device communicatively coupled to an external authenticator for locking and unlocking the integrated circuit using a secret sharing technique.

The techniques herein can be applied to a wide range of IC designs and electronic systems. Coarsely speaking, the techniques are applicable to devices having a primary bus (or a small number of them) such that disabling this bus disables the entire device. FIG. 1 illustrates an example system configuration of locking/unlocking an IC, more particularly a bus of that IC, using a secret sharing technique between the IC during manufacture and an external authenticator. The IC can be of any of a broad category of electronic devices that rely upon a primary bus for operation, including: (1) numerous IC devices compatible with USB, PCI, PCI-E, and AMBA bus architectures and other bus standards typically used in System-on-a-Chip designs and computer peripherals; (2) SRAM-based FPGAs that are programmed through an input bus; (3) general-purpose and embedded microprocessors, including soft cores or multiple hardware cores; (4) DSPs; (5) network processors; and (6) game consoles. In general, the present techniques provide a manner of protecting against unauthorized operation of the IC, including unauthorized attempts to test IC operation. This is achieved, at least in part, by being able to lock/unlock bus operation of the IC. In this way, the design, operation, layout, etc. of the IC (which may all be consider intellectual property pertaining to the IC) may be protected from unauthorized copiers.

The external authenticator may be any type of IC circuit device as well, including any of the foregoing. In some examples, the authenticator is a processor-based device that, as discussed below, is housed at or at least controlled by an entity having access, and or other rights, to the intellectual property pertaining to the IC. The authenticator can communicate directly with IC through remote, wired or wireless communication to suitably control locking/unlocking of the IC.

In FIG. 1, an IC 10 is coupled to an authenticator 12 through a communication link 14, which may be a wired communication path such as through a bus architecture like USB, PCI, PCI-E, and AMBA or through an Ethernet connection or other computer-to-computer or peripheral-to-peripheral communication link. The IC 10 is a bus-based device having a bus-architecture 16 that may include a main, system bus and various subsystem buses connecting a central processor 18 to various subsystems 20 and an input/output controller 22 connected to the communication link 14. The authenticator 12 includes an input/output controller 24 for communicating with the IC 10 and a central processor 26. Both devices 10 and 12 include memories 28, 30, respectively. In examples discussed below, the authenticator is described as being communicating with the IC through communication link that is physically external to the IC. The present application is not limited to these particular configurations. The authenticator 12, for example, may be a processor-based device physically located on the same overall IC design or same chipset or motherboard. In some such examples, an explicit input/output controller (such as controllers 22 and 24) may not be necessary. The authenticator, for example, may be a processor on an IC that is configured to communicate with another processor on the IC to lock a bus connecting the two. An example, would be a central processor locking a graphics processing unit from operation.

Figure 2:
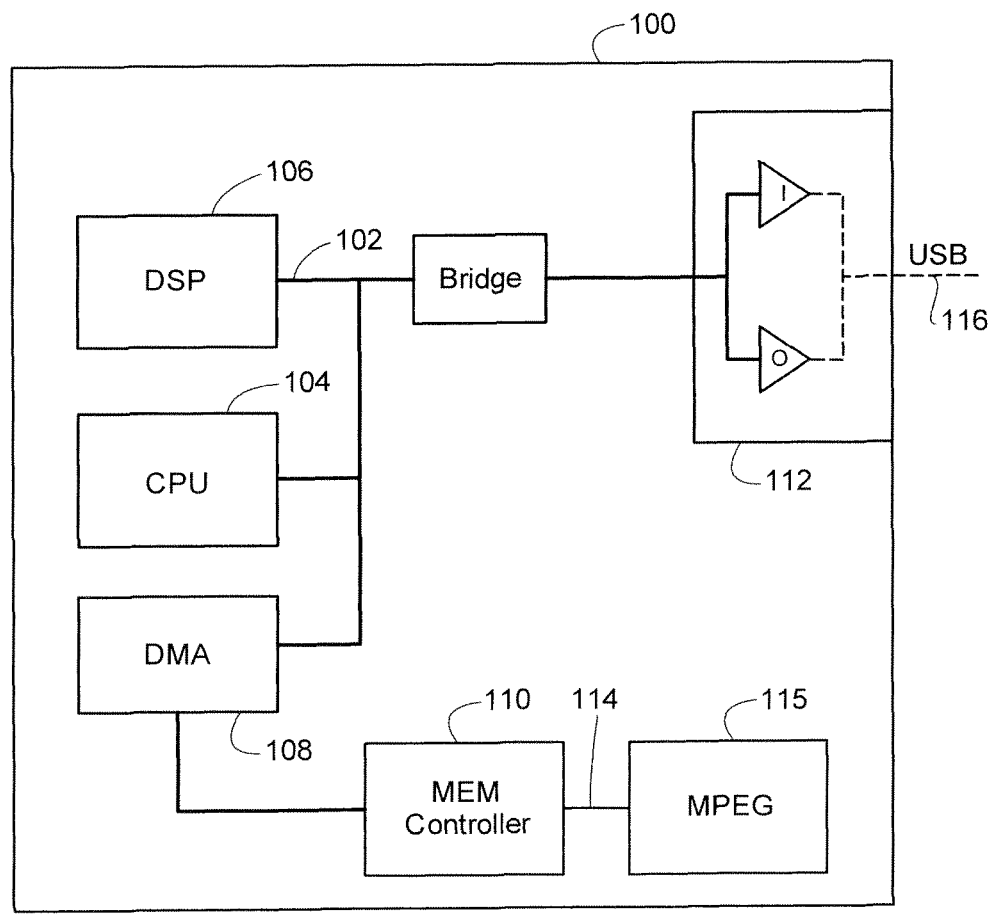
FIG. 2 is block diagram of an integrated circuit, in the form of a IC chip having a System-on-a-chip (SoC) architecture, and illustrating examples of bus-locking on the IC chip.

FIG. 2 illustrates an example IC, such as IC 10 in FIG. 1, using a System-on-a-chip (SoC) architecture 100. IC 100 may be locked in number of different ways. For example, the chip 100 can be locked by disabling system bus 102 which provides data throughput amongst CPU 104, DSP 106, and direct memory access (DMA) 108 coupled to a memory controller 110. Alternatively, or in addition, the chip 100 can be cut off from the outside world by disabling I/O bus 112 in accordance with the teachings herein. Further still, the present techniques may be used to lock only specific features of the chip 100, for example, by disabling feature-specific busses such as a dedicated MPEG bus 114 for an MPEG controller 115. FIG. 2 also illustrates that an external bus 116 (in this case a USB bus) can be disabled by placing an external lock in accordance with the present teachings. For example, implementing the communication link 14 as a bus architecture, the present techniques may be used to lock the communication link between an IC and an external authenticator.

The present techniques are not restricted to protecting a single IC, but rather may be generalized to larger electronic systems. In many such applications, external busses are driven by software, e.g., to program FPGAs, to support bus-based peripherals (USB, PCI-X, Firewire, etc.) through device drivers. Thus, software may be used to protect hardware IP (e.g., IC layout) if the activation protocols require that cryptographic keys possessed by the software and by the hardware match. In this way, software executing at an authenticator may be used to protect (lock/unlock) hardware on the IC. Vice versa, by securing hardware, one can improve the environment for securing software.

The techniques for locking IC busses can have several distinct advantages. First, many current and pending IC designs contain busses, including bus-based IP, FPGAs, microprocessors, and DSPs. Second, busses are critical parts of the design, transferring data, chip access information, priorities, clock, and power for most ICs. Third, in FPGAs and other reconfigurable devices, core programming is performed through busses, in particular by placing an encrypted bit-streams on the busses. Fourth, connections to the memory are often accomplished by address busses, creating an opportunity to lock important features of the chips. The locking of busses, and the decisions of which buses to lock, may be achieved in such a manner that all communication with the IC is locked, and thus blocked, or where communication is allowed with certain processes of the IC, but not others. For example, a microprocessor with a disabled memory interface may still be tested by running carefully selected sequences of commands, but that microprocessor would not be commercially viable for use. Lastly, word-level processing in microprocessor and DSP data-paths also require an indispensable data bus, which facilitates high-level synthesis, structural layout and leading-edge performance.

The techniques for bus locking can be cast within a communication-based design paradigm or a platform-based design paradigm. In large-scale embedded systems, communication between independent components is of prime concern. Consider the output and input components as sender and receiver, respectively, for example an IC circuit functioning as a sender and an authenticator as a receiver, or vice versa. The sender may be modeled as process $S(F_s: I_s \Rightarrow O_s)$ and the receiver by the process $R(F_r: I_r \Rightarrow O_r)$. The connection implies that the input space of R is restricted to the intersection $O_r \cap I_r$. If the sets S and R have mismatches, there will be three possible scenarios: (1) R discards the inputs and treats them as errors, i.e., a mechanism for error handling must be added; (2) the outputs of S causing the mismatches will be removed from S; and (3) signals from S are mapped to signals acceptable by R. In the latter case, an interface is utilized to transform the S output to the domain of R. Such an interface is typically split into two processes that encapsulate S and R and permit communication between the modified behavior over a connection. Connections are implemented using physical channels, i.e., busses. In emerging large-scale designs with many components it is not surprising that the bus-based methodology is gaining so much importance, e.g., in SoC designs.

Figures 3A, 3B:
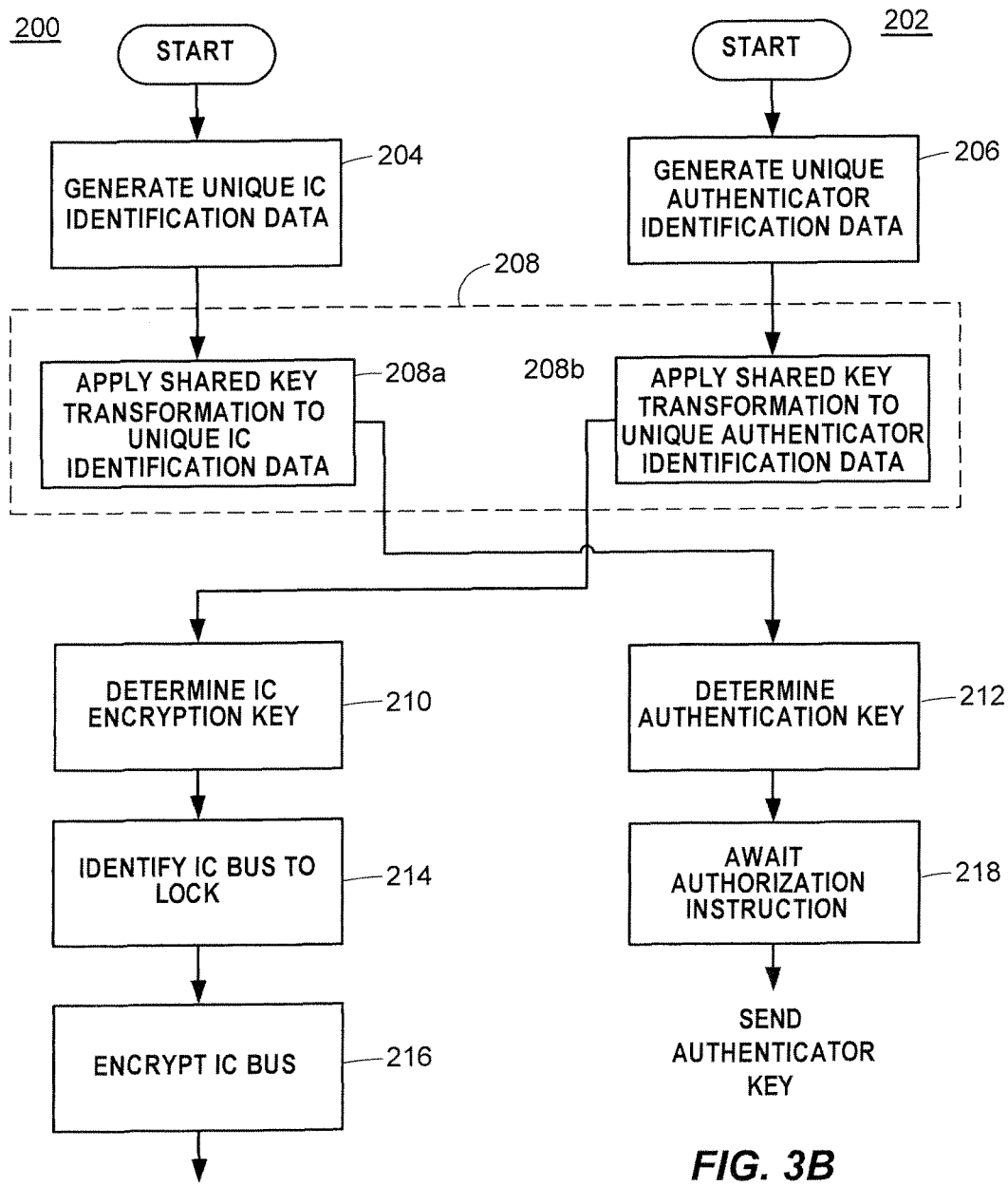
FIG. 3A is a flow diagram of an example locking process for encrypting a bus within an IC using a secret sharing technique with an authenticator.
FIG. 3B is a flow diagram of an example unlocking process for decrypting a bus within the IC using the authenticator.

FIG. 3A illustrates an example process flow 200 for locking a bus on an IC through a shared secret technique with an authenticator. FIG. 3B illustrates an example process flow 202 for unlocking the bus of an IC locked by FIG. 3A. Initially, a block 204 generates a unique IC identification data. This may be achieved by the IC using a firmware embedded in the IC or software running on top of the IC. The unique IC identification data may be randomly determined, for example, by using at least one of timing fluctuations, power fluctuations, or other fluctuations in physical parameters of the digital bus-based device. In some examples, the unique IC identification data may be determined by an external system and communicated to the IC. Turning to FIG. 3B, a block 206, preferably executed by software in the authenticator, generates its own unique authenticator identification data, that corresponds to the IC under examination. For both processes 200 and 202 the respective unique IDs are communicated to a transformation process 208a, 208b that executes secret, shared transformation on each unique ID. That is, the IC performs a transformation using block 208a and the authenticator using block 208b, where preferably those transformations are the same. From the unique ID transformation, an encryption key is determined at block 210 by the IC and an authentication key is determined at block 212 by the authenticator. The respective keys, however, are determined by the transformed unique IDs of the other user. That is, the authenticator receives and uses the transformed IC identification data from the IC to determine the authentication key; and the IC receives and uses the transformed authenticator identification data to determine the encryption key. The transformed IDs may be communicated from one user to the other over a wired or wireless communication link, such as a data network.

To lock the IC, the IC determines which bus is to be locked at block 214 and then encrypts that bus using the encryption key via block 216. To unlock the IC after encryption, the authenticator awaits authorization to send the authentication key (218) and then communicates the authentication key to the IC. The IC compares that authentication key to the encryption key to determine whether the encrypted IC bus should be decrypted.

FIG. 4 shows a timing flow diagram 300 of an example locking and unlocking, i.e., activation, approach for a new IC design, where there are two parties involved, in this example the design house (user 302) and the foundry or fabrication house (user 304).

Initially, the user 302 determines details of an IC design, including for example logic blocks, address lines, memory, component layouts, pins, and built-in test structures for the IC, at block 306. Such details may be built up by the user and/or provided to the user and may be based on known IC design techniques. These details may include the physical IC layout based on the register transfer level (RTL) description and stored in a database file format, of which GDS II stream format is an example, although any suitable format may be used.

The GDS II design files containing the details of the IC design are sent to the user 304 by the user 302 via block 306 and a communication link 308. The user 304 then builds a mask that fabricates these received design files at block 310. Multiple IC may then be fabricated using the same mask (block 312). After fabrication, each IC may then be powered up for testing (block 314).

In the illustrated example, after power up, each IC generates a unique identification data (ID) (block 316) that identifies that particular IC. The ID for an IC is randomly generated and different from the ID generated by the other ICs, even the other ICs of the same masking design. This unique IC ID is thus specific to the particular IC under testing. In the illustrated example, the unique ID is to be used in a shared secret key system over a potentially insecure communications link. Each user receives a unique ID from the other user and applies a transformation to the received unique ID.

For example, the unique ID for each IC may be used as a Diffie-Hellman (D-H) secret b value, where the notation b is as defined for the D-H protocol described below. The block 316 generates each unique IC ID and determines values $g^b$ mod p for each ID. The values $g^b$ mod p and provided to the user 302 to block 318, over the communication link 308. The user 302 also generates its own unique ID for each IC under testing, i.e., a unique authenticator ID, at block 319, which also determines a value $g^a$ mod p from that unique ID. The user 302 then communicates the transformed value $g^a$ mod p to the user 304 over the link 308 to a block 320.

Both users can now compute the D-H shared secret without needing to communicate that secret or any information that would expose it, because both users 302 and 304 are using the same known transformation protocol on unique IDs. At blocks 318 and 320, respectively. Both users have the same one-way function, $f$. At 322, the function $f$ is applied, in hardware on the IC, to determine an encryption key. The user 302 computes the shared secret in software at 324, where the shared secret is the input to $f$, and stores that value (at 325) awaiting an authorization instruction to send the value to the user 304. For user 304, the output of $f$ is used for encrypting the bus lines of the ICs at 322. Since the function $f$(shared key) is one-way, an attacker who does not know $f$ or the shared key cannot generate the unlocking sequence.

If the activation authority 325 at the user 302 agrees to activate the IC, the user 302 then transmits the computed activation key, i.e., the $f$(shared key) or also termed the authentication key, to the user 304 over the link 308. The activation authority may be initiated by administrator authorizing transmission of the authentication key or through automated software and or hardware means, such as through separate communication between the user 304 and the user 302 to indicate that activation of the IC is desired. In some examples, the user 304 may automate activation by routinely connecting every manufactured IC to a communication channel (a phone line, an internet connection, etc) and allowing the IC, relevant software and packaging equipment to perform necessary steps. The latter can enclose a newly obtained activation key for sale.

The user 304 at block 326 attempts to activate the encrypted IC, for example, by comparing the received authentication key to the encryption key from block 322. If the keys provide a valid comparison, e.g., if they are identical, then the block 326 decrypts the bus that has been encrypted with the activation key at the block 322. The user 304 then encloses the activation code on the chip for commercial sale 328. If there is no activation attempt by the user 302, then the activation key is not communicated to the user 304 and the IC is not activated and therefore is unusable.

This describes a process for activating a new IC chip.

While numerous cryptographic public key exchange schemes may be used for the transformation of the unique IDs, between the user 302 and the user 304, in a preferred embodiment, the Diffie-Hellman (D-H) public key exchange is used. A background on D-H is provided.

Public key cryptography protocols provide a way for sharing secrets (keys) between two users such that the shared key is never revealed during inter-user communications. Moreover, an eavesdropper (for example trying to listen in on communication link 308) who intercepts messages between the users will be unable to reconstruct the secret. The technique is referred to as asymmetric cryptography since the information exchanged between the users to construct the shared key is different. Asymmetric cryptography, introduced by Diffie and Hellman (D-H) in 1976, uses a mathematical "one-way" function that can be quickly computed in polynomial time, but is hard to invert. The D-H secret sharing protocol uses modular exponentiation. It considers a multiplicative group of integers $C_p$ modulo p, where p is a prime number and g is a primitive root mod p. Using D-H, two users A and B can share a common secret. First, A and B select an element $g \in C_p$; g is not secure since it is transparent to the attackers. Next, user A randomly selects a natural number a and sends $g^a$ to user B. (Here all operations are performed within $C_p$, e.g., $g^a$ corresponds to ($g^a$ mod p) in terms of integers.) Likewise, B randomly chooses another number b and sends $g^b$ to A. Both users can individually compute the same secret, which is calculated as $(g^a)^b$ and $(g^b)^a$ by user A and user B respectively.

For many years, the only way designers could assert rights to their IP (outside the royalty agreement) was to embed watermarks in the application specific integrated circuit (ASIC) or FPGA design. In FPGAs, encrypting the bitstream and exploiting the flexibility of the programmable platform has enabled a number of additional access control primitives.

Development of techniques for locking and activation of ICs after manufacturing has only now been effectively developed. The idea of unique activation of chips by exploiting design features known only to the designer and not extractable at the foundry was first proposed by Y. Alkabani, and F. Koushanfar, "Active hardware metering for intellectual property protection and security", USENIX Security, pp. 291-306, 2007. Y. Alkabani, F. Koushanfar, and M. Potkonjak, "Remote activation of ICs for piracy prevention and digital right management", ICCAD, pp. 674-677, 2007. In their scheme, the original finite state machine (FSM) of the design is augmented with many new states. The system is engineered so that the power-up state of each chip is non-functional (locked) and determined by the unique random variations of that IC. The designer, having access to the transition function of the FSM is the only entity that can unlock the chip and bring it to the hidden original state. More recently, another method based on replicating a few states of the finite state machine, adding control logic on state sequences, and using the challenge-responses from physically unclonable functions (PUFs) was proposed. The IC's operation would be halted unless the proper unlocking sequence is applied.

The present techniques improve upon these FSM-based locking attempts, and provide the first bus-based IC locking and activation scheme, that works by uniquely locking each chip at the manufacturing site. The locking is performed by unique random IDs on each chip and secret sharing between the IP rights owner and the chip.

In any event, returning to the particulars of the techniques discussed herein, to prevent multiple attempts at chip activation, the activation key (also termed the authentication key) may be stored in the IC by "burning" random bits into irreversible fuses or software. Or, the activation key must be entered into vendor-supplied software for the IC to become operable, as is the case with FPGAs and device drivers for personal computers. Alternatively, the activation key can be entered into the IC through a dedicated activation pin, using a simple signaling protocol. In some examples, an existing pin can be multiplexed for activation, given that the chip itself and its normal pins cannot be used before activation.

In order to implement the overall flow introduced above, circuit-level bus-locking techniques are used. In particular, the bus to be locked is equipped with additional bus-key inputs such that only a certain key combination activates the bus, while all other combinations would scramble it. This could be accomplished, for example, by XORing key bits with bus lines, but such a naive theft or copying technique is too easy to circumvent in practice.

Particular to this notion is the use of reversible transformations, specifically any reversible transformation on address/data lines that can be efficiently controlled by a key of sufficient length. The transformation should preferably have small hardware overhead and should be easy to reverse in device drivers, software used to program FPGAs, etc. depending upon the type of IC design.

The following categories of reversible transformations are considered.

XOR with a key uses an n-bit key for an n-bit bus.

Arithmetic transformations can be implemented with modular addition and subtraction. Key length is n for one arithmetic operation.

Bit permutations can be implemented using Benes networks where key length is n log 2n bits. An example of an 8-bit Benes network is shown in FIG. 5. Efficient implementations of Benes networks produce arbitrary permutations in one cycle of a high-performance microprocessor when pipelined.

Linear transformations over the field F2 can be implemented using only NOT and XOR gates. Others have shown algorithms that generates near-optimal circuits for them where fan-outs are limited to two, which can simplify layout. Authentication key length is n2/log n due to Lemma 1 and Theorem 1 of K. N. Patel, I. L. Markov and J. P. Hayes, "Efficient Synthesis of Linear Reversible Circuits", IWLS, pp. 470-477, 2004.

Arbitrary reversible transformations, as used herein, include all of the transformations described above and rather than permute n wires, they permute all possible combinations of n wires. Thus, there are 2n! such circuits, making authentication key length log 2(2n!)~2n(n ln n−1)+1 (using an integration by parts approximation).

There are some drawbacks to the various cryptography transformations described above. Both XOR locking and arithmetic locking use n-bit keys, which may be too few for small busses. XOR locking leaves many bits unmodified on average, which may make it easy to crack. Arithmetic locking may succumb to some form of differential analysis. Also, adding a small number to the current address combination will not change the most significant bits. Key length for linear transformations and arbitrary reversible transformations can be too large, and incur significant overhead. In addition, optimal circuits to implement any reversible transformation using NOT, XOR and AND gates have been shown as generally difficult to find.

While these types of transformations may be used in certain examples, the preferred reversible transformations are bit permutations. They have efficient circuit implementations and key lengths larger than the size of the bus, but not as large as linear transformations or arbitrary reversible transformations. Furthermore, in some circumstances bit permutations and arithmetic locks could be used together, for example, in the event that permutations do not change the number of zeroes in the data along the bus.

To assess the efficacy of bit permutations, we consider various types of IP theft or copying attacks and corresponding countermeasures in accordance with the teachings herein. The following types of attacks against a bus-based hardware protection as discussed herein are considered.

(i) Brute-force attack. Here, an attacker aims to activate the pertinent IC by applying multiple keys hoping that one would randomly be the authentication key. In more sophisticated versions of this attack, the attacker may attempt to find a pattern in the already unlocked ICs and build a model that could help perform a more efficient search for the authentication key.

(ii) Replication attack. The attacker attempts to copy (clone) the random unique sequence of an authorized IC and then use the authentication key received for the cloned IC to activate it.

(iii) Read-only access to masks. An attacker who has access to masks may attempt to obtain the secret integer from the IC. The basic premise of the D-H cryptography scheme is that the integers from the two users and the final shared key are never revealed. Reading out the IC's secret facilitates breaking of the D-H secret sharing scheme.

(iv) Removal attack. The attacker may attempt to remove the bus locking circuitry so that the ICs will be unlocked upon manufacturing.

(v) Man-in-the-middle attack. In this attack, the attacker intercepts the semiconductor designer's public value and transmits its own public value to the IC. When IC sends its public value, the attacker substitutes the IC's public value with its own and transmits that to the designer. Therefore, the attacker and the designer agree on one shared key and the IC and the attacker agree on another shared key. Now, the attacker can simply decrypt messages transmitted by the designer and the IC, and can read and potentially modify them before re-encrypting with the proper key and sending them to the other party. This vulnerability is possible because the D-H key exchange protocol does not authenticate the users.

(vi) Side-channel attack. Several cryptography protocols, including D-H, have been shown to be vulnerable to side-channel attacks. An attacker with access to the chip that runs these protocols can externally measure the power/timing of the signals many times. The attacker can use inference techniques on the IC's power/timing data to guess the key with a high probability.

To ensure resiliency against these various types of attacks, the present techniques may be expanded to include the following countermeasures.

Increasing the key length. An effective way to complicate, obstruct or otherwise hamper the possibility of attack (i) is to add to the key length. The longer the encryption and authentication keys, the lower the probability of randomly guessing the correct combination. Preferably the key lengths are 64 bits or above. More preferably, the key lengths are between 64 bits and 128 bits. The range of optimum key lengths, however, will depend upon the size of the bus being locked, whether system bus, internal sub-system bus, I/O bus, external bus, or otherwise. In some examples, the key length is specifically set based on the type of bus to be locked.

Unclonability. A unique and unclonable ID, i.e., the bit string containing the ID, extracted from the IC can be integrated into the one-way function $f$. Thus, attack (ii) will be ineffective since the key used for unlocking one IC will be a function of its unique variations and cannot be utilized for activating the busses of other chips. The unique and unclonable ID may be a part of the message communicated between the IC and the IP rights owner (e.g., between users 304 and 302) who will then use it as input to the one-way function. This countermeasure is also effective against attack (iii), since the unclonable IDs are typically a function of unique post-silicon manufacturing variability of each IC that is not available at the mask level.

Design complexity. Miniaturization of devices and active integration of the locking/unlocking circuitry in the bus and address encoding/decoding impedes reverse-engineering. Thus, attack (iv) is not plausible since the attacker cannot distinguish/disintegrate or remove the lock.

One-way function. The use of the one-way function as described herein deters the effectiveness of attack (v). In other words, even if a man-in-the-middle establishes two different channels one with the IC and one with the designer, the attacker will not be able to compute the key specific to the IC or to use the key given for another chip.

Randomization. To alleviate the correlation between the power and timing signals and the computed unique key, random timing and power activities may be used. Therefore, the side-channel attack (vi) will not be effective. A number of other methods that are commonly used for removing the information from the side-channel can be adopted, for example, one can equalize the D-H computation such that the peak power or time is not extractable from the differential external pin measurements.

Any of these measures may be used together or individually to provide sufficient countermeasures against IP attacks in accordance with the teachings herein.

These techniques can be implemented with low overhead while still maintaining key-strength.

The overhead of the proposed bus-locking scheme can be traced to three components: (1) an implementation of the Diffie-Hellman (D-H) protocol, (2) pins and communication circuits, and (3) circuit-level bus locking. Two main implementation factors can help ensure small overhead. First, the proposed protocol exchanges very few bits (e.g., <1000) and therefore does not require high speed. Second, most of an IC chip remains disabled during activation. Therefore, on-chip resources may be multiplexed and reused during activation. This particularly involves I/O pins, as well as arithmetic and cryptographic modules available on the chip.

Diffie-Hellman circuits. One of the reasons D-H is preferred rather than other transformation schemes, such as the more recent RSA cryptography, is that the D-H scheme is much easier to implement. While modern RSA circuits (e.g., the ones from OpenCores open source community) require on the order of 15,000 standard cells, D-H can be implemented using one tenth of these resources. In fact, D-H circuits are dominated by modular exponentiation which can be implemented efficiently by repeated squaring and modular multiplication. Most textbook multiplication circuits are sufficient in terms of speed, and no pipelining is necessary, because D-H circuits do not lie on critical paths in an activated chip. Area can be further minimized by using a half-sized multiplier with an adder. Moreover, several modern processors, such as Niagara1 and Niagara2 from Sun Microsystems Inc. of Santa Clara, Calif., include support for cryptography and particularly fast modular exponentiation (they include RSA as well) on the processor. Since the processor remains dormant during activation, it may be possible to use only its arithmetic circuits for D-H. Alternatively, a stand-alone D-H implementation may be used, in which the stand-alone D-H circuit can be turned off (gating) its clock and power trunks when they are not needed. While the D-H protocol is described, in other examples other protocols may be used, including RSA, depending on the system and integrated circuit environment. The techniques are not limited to D-H protocol.

I/O pins. Given the small number of bits transferred during activation, the entire authentication key exchange can be serialized through a single I/O pin using a simple handshaking protocol. Moreover, given that the chip remains largely disabled before activation, one of its existing pins can be multiplexed to support activation. Such multiplexing, however, may entail a small increase in latency during normal use. The communication circuits required for serialization, deserialization and handshaking implement very simple finite state machines (FSMs) with only a handful flip-flops each. These only operate during activation and can be turned off during normal use.

Circuit-level bus locking. While circuit-level bus locks do not require as many gates as modular exponentiation circuits for the D-H protocol, they cannot be turned off and may slow down the host bus. Therefore, they are the main source of overhead in the proposed bus-locking scheme. As a result, permutation circuits that have already been optimized and implemented within microprocessor designs can be used. Such circuits require only $2n \log_2 n$ MUX gates which is considerably smaller than an n-bit multiplier, for example. Further, their logic depth, when pipelined, is $\log_2 n$, which is comparable to an ALU for modern designs. Thus they can produce one permutation every cycle, which is fast enough for many implementations.

The countermeasures described above are sufficient to defeat attacks (ii)-(vi). The countermeasure for attack (i), brute-force key testing, is to increase key length so as to make the attack infeasible for modern circuits. To show that this method was secure, a comprehensive analysis of a Benes networks used in R. B. Lee et al., "Single-Cycle Bit Permutations with MOMR Execution," J. Comp. Sci. Tech. 20(5), 2005 was performed—this Lee et al. reference is incorporated herein by reference, in its entirety. It will be appreciated that while a Benes network is described in an example, to achieve efficiency, the present techniques are not limited to such networks. The techniques may be implemented in other manners and on other networks.

The circuits described in Lee et al. for arbitrary bit permutations included $2 \log_2 n$ stages of n MUX gates each. $n/2$ bits control each stage for a total of $n \log_2 n$ key bits.

As there are $n \log_2 n$ bits per key, this gives $2^{n \log_2 n} = n^n$ possible key combinations, which is much larger than the number of permutations of n bits, $$n! \approx \sqrt{2\pi n}\left(\frac{n}{e}\right)^n$$

(by Stirling's approximation). If key combinations were mapped to permutations by the circuit uniformly, approximately $$\frac{e^n}{\sqrt{2\pi n}}$$

key combinations would map to each permutation. Even though the number of keys that map to a permutation grows nearly exponentially, the probability of guessing a valid key combination at random is 1 in $$\sqrt{2\pi n}\left(\frac{n}{e}\right)^n \approx n!.$$

Thus a brute-force attacker would need to test n! key combinations on average to find a working key. Therefore, the techniques applied to this situation show substantial effectiveness.

Unfortunately, permutation circuits do not map keys to permutations uniformly. We fully analyzed an 8-bit Benes network, shown in FIG. 3, to see how non-uniform the mapping of keys to permutations is and what ramifications this has on the effective bit-length of permutation keys. FIG. 5 illustrates that the computation is pipelined so that one permutation completes per cycle. A butterfly network 400 is applied on the first cycle and an inverse butterfly network is applied on the second cycle 402. To completely analyze the behavior of the circuit, we use ROBDD-based equivalence checking for each of the 8!=40320 permutations of 8 bits. We constructed a miter circuit for each permutation which produced a 1 as the output when the circuit produced the correct permutation, we universally quantified out all of the non-key inputs, and we counted the number of key combinations that make the miter evaluate to 1 using standard ROBDD operations.

| # Valid key combs | # Perms | Total key combs | % Key combs |
|---|---|---|---|
| 128 × | 8192 = | 1048576 | 6.25% |
| 256 × | 14336 = | 3670016 | 21.88% |
| 512 × | 12288 = | 6291456 | 37.50% |
| 640 × | 2048 = | 1310720 | 7.81% |
| 1024 × | 2816 = | 2883584 | 17.19% |
| 2048 × | 512 = | 1048576 | 6.25% |
| 4096 × | 128 = | 524288 | 3.13% |
| Total | 40320 | 16777216 | 100% |

Table 1 above illustrates the input collisions in an 8-bit Benes network. The first column gives the number of equivalent key combinations for a permutation. The second column counts permutations with that number of equivalent keys. The third column aggregates key combinations (out of 2^24) that the row covers.

Table 1 shows complete statistics for an 8-bit Benes network. The degree of non-uniformity in mapping key combinations to permutations is somewhat surprising. In the best case, there are 8192 permutations where only 128 key combinations map to that permutation, which makes for an effective key length of $\log_2(2^{24}/128)=17$. In the worst case, there are 128 permutations for which 4096 key combinations map to the permutation. These permutations, one being the identity permutation, have an effective key length of $\log_2(2^{24}/4096)=12$. If we extrapolate the worst case to larger circuits, such that the worse case effective key length is half the total key length, 32-bit busses would be protected by 80-bit keys, and 64-bit busses by 192-bit keys. To crack a 32-bit permutation, an attacker would need to check $2^{80} \sim 10^{24}$ keys. If the attacker had access to one thousand 5 GHz processors that can check one key per cycle, it would take over 7000 years to crack a 32-bit permutation; cracking a 64-bit permutation would take over $10^{37}$ years.

The techniques herein propose the first bus-based IC locking and activation scheme, that works by uniquely locking each chip at the manufacturing site. The locking is performed by unique random IDs on each chip and D-H secret sharing between the IP rights owner and the chip. The techniques can be applied to a wide range of applications, using an implementation based on permutations and one-way functions, that are designed to ward off attacks using particular countermeasures that may be optionally used. Evaluation results confirm that the locking scheme has a very low overhead while it is highly resilient against attacks.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A method for locking a bus in a digital bus-based device, the method comprising:

the digital bus-based device generating a first unique identification data (ID) for the device such that the first unique ID is different than IDs for a plurality of other digital bus-based devices fabricated along with the digital bus-based device;

an authenticator external to the digital bus-based device generating a second unique ID for the digital bus-based device, where both the authenticator and the digital bus-based device apply a first transformation rule on their respective first and second unique IDs;

communicating the first unique ID, applied to the transformation rule, from the digital bus-based device to the authenticator and in response the authenticator determining a first secret authentication key derived from the received first unique ID applied to the transformation rule;

communicating the second unique ID, applied to the transformation rule, from the authenticator to the digital bus-based device and in response encrypting the bus in the semiconductor bus-based device with a second secret authentication key derived from the received second unique ID applied to the transformation rule; and communicating the first secret authentication key to the digital bus-based device, wherein the digital bus-based device determines if the first secret authentication key is the same as the second secret authentication key in which case the bus in the digital bus-based device is decrypted, wherein if the first secret authentication key is not the same as the second secret authentication key, the bus in the digital bus-based device remains encrypted.

2. The method of claim 1, wherein the bus is a system bus for the device, a bus for a particular sub-system of the device, an external interface bus, or an input/output bus.

3. The method of claim 1, wherein the first unique ID is a first Diffie-Hellman (D-H) determined secret value and the wherein the second unique ID is a second D-H determined secret value, and wherein the authenticator and the digital bus-based device communicate according to a D-H protocol.

4. The method of claim 1, wherein the digital bus-based device is an application specific integrated circuit, field programmable gate array, System-on-a-chip, microprocessor, digital signal processor, graphics processing unit, central processing unit, network processor, embedded processor, or a memory controller.

5. The method of claim 1, wherein the first unique ID and the second unique ID are generated randomly.

6. The method of claim 5, wherein the random first unique ID and the random second unique ID are generated using at least one of timing fluctuations, power fluctuations, or other fluctuations in physical parameters of the digital bus-based device.

7. The method of claim 6, wherein the random first unique ID and the random second unique ID are generated using at least two of the timing fluctuations, the power fluctuations, or the other fluctuations in physical parameters of the digital bus-based device.

8. The method of claim 1, wherein at least one of the first authentication key and the second authentication key has a length of at least 64 bits.

9. The method of claim 1, wherein the authenticator determines the first secret authentication key using a one-way function, and wherein the digital bus-based device determines a second secret authentication key using the one-way function.

10. The method of claim 1, wherein the first secret authentication key is communicated to the semiconductor bus-based device on a dedicated authentication connector pin of the device.

11. The method of claim 1, wherein the transformation rule is a modulo function.

12. The method of claim 1, wherein the digital bus-based device is a semiconductor device.

13. A method for controlling activation of an integrated circuit (IC) having a unique IC identification data, the method comprising:

an authenticator external to the integrated circuit generating a unique authenticator identification data corresponding to the IC, the authenticator being coupled to the IC through a bus;

applying a transformation rule to the unique IC identification data and to the unique authenticator identification data to form a transformed IC identification data and a transformed authenticator identification data, respectively;

sharing the transformed IC identification data and the transformed authenticator identification data;

deriving a first secret authentication key from the transformed IC identification data and deriving a second secret authentication key from the authenticator identification data; and encrypting a bus in the IC using the second secret authentication key, wherein the bus in the IC remains encrypted unless the IC receives the first secret authentication key and determines that a comparison of the received first secret authentication key and the second secret authentication key is valid.

14. The method of claim 13, further comprising:
communicating the first secret authentication key to the IC over the bus;
the IC comparing the first secret authentication key to the second secret authentication key; and
in response to the comparison of the first secret authentication key and the second secret authentication key, activating the IC device for operation if the comparison is valid or deactivating the IC device to block operation if the comparison is invalid.

15. The method of claim 13, wherein the bus is a system bus for the IC, a bus for a particular sub-system of the IC, an external interface bus, or an input/output bus.

16. The method of claim 13, wherein the unique IC identification data is a first Diffie-Hellman (D-H) determined secret value and the wherein the unique authenticator identification data is a second D-H determined secret value, and wherein the authenticator and the IC communicate according to a D-H protocol.

17. The method of claim 13, further comprising:
the IC randomly determining the unique IC identification data; and
the authenticator randomly determining the authenticator identification data.

18. The method of claim 17, wherein the unique IC identification data and the unique authenticator identification data are randomly determined using at least one of timing fluctuations, power fluctuations, or other fluctuations in physical parameters of the IC.

19. The method of claim 17, wherein the unique IC identification data and the unique authenticator identification data are randomly determined using two or more of the timing fluctuations, the power fluctuations, or the other fluctuations in the physical parameters of the IC.

20. The method of claim 13, wherein the IC is an application specific integrated circuit, field programmable gate array, System-on-a-chip, microprocessor, digital signal processor, graphics processing unit, central processing unit, network processor, embedded processor, or a memory controller.

21. The method of claim 13, wherein at least one of the first authentication key and the second authentication key has a length of at least 64 bits.

22. The method of claim 13, further comprising:
the authenticator deriving the first secret authentication key from the transformed IC identification data using a one-way function; and
the IC deriving the second secret authentication key from the authenticator identification data using the one-way function.

23. The method of claim 13, further comprising communicating the first secret authentication key to the IC on a dedicated authentication connector pin of the IC.

24. The method of claim 13, wherein the transformation rule is a modulo function.

* * * * *